(12) United States Patent (10) Patent No.: US 12,626,160 B2
Ezrielev et al. (45) Date of Patent: May 12, 2026

---

(54) MANAGING IMPACT OF POISONED INFERENCES ON DEPLOYMENTS OF HARDWARE TO DOWNSTREAM CONSUMERS

(71) Applicant: Dell Products L.P., Round Rock, TX (US)

(72) Inventors: Ofir Ezrielev, Beer Sheva (IL); Tomer Kushnir, Omer (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 517 days.

(21) Appl. No.: 18/459,144

(22) Filed: Aug. 31, 2023

(65) Prior Publication Data

US 2025/0077910 A1 Mar. 6, 2025

(51) Int. Cl.
*G06N 5/00* (2023.01)
*G06N 5/04* (2023.01)
(52) U.S. Cl.
CPC ..................................... *G06N 5/04* (2013.01)
(58) Field of Classification Search
CPC ....................................................... G06N 5/04
See application file for complete search history.

(56) References Cited

U.S. PATENT DOCUMENTS

| 6,922,816 B1 | 7/2005 | Amin et al. |
| 10,936,173 B2 | 3/2021 | Ubillos et al. |

| D917,546 S | 4/2021 | Mayler et al. |
| 11,030,709 B2 | 6/2021 | McLinden et al. |
| 11,354,602 B2 | 6/2022 | Kursun |
| | (Continued) | |

FOREIGN PATENT DOCUMENTS

| EP | 4481632 A1 | 12/2024 |
| KR | 20250011365 A | 1/2025 |
| | (Continued) | |

OTHER PUBLICATIONS

Anastasovski, Goce, "Classification of Malicious Web Traffic" (2013). Graduate Theses, Dissertations, and Problem Reports. 153. (118 Pages).

(Continued)

*Primary Examiner* — Mahesh H Dwivedi
(74) *Attorney, Agent, or Firm* — WOMBLE BOND DICKINSON (US) LLP

(57) ABSTRACT

Methods and systems for managing impact of inferences provided to inference consumers on decisions made by the inference consumers are disclosed. Poisoned training data may be introduced and used to train an AI model, which may then poison the AI model and lead to poisoned inferences being provided to the inference consumers. Inference consumers may deploy hardware to customers based on the poisoned inferences. To determine whether to modify the deployed hardware, a performance cost associated with the deployed hardware may be obtained. The performance cost may indicate a deviation between operation of the deployed hardware and operation of hardware that may have been deployed if an unpoisoned inference was used. If the performance cost meets a performance cost threshold, at least one additional hardware component may be deployed to the customer.

20 Claims, 8 Drawing Sheets

(56) References Cited

U.S. PATENT DOCUMENTS

| | | | | |
|---|---|---|---|---|
| 11,449,942 | B2 | 9/2022 | Basu et al. | |
| 11,460,997 | B2 | 10/2022 | Homma et al. | |
| 11,783,025 | B2 | 10/2023 | Molloy | |
| 2018/0293516 | A1 | 10/2018 | Lavid Ben Lulu | |
| 2019/0251479 | A1 | 8/2019 | Anderson | |
| 2020/0082097 | A1 | 3/2020 | Poliakov | |
| 2020/0334122 | A1* | 10/2020 | Shepard | G06F 11/3089 |
| 2020/0380118 | A1 | 12/2020 | Miller | |
| 2021/0051169 | A1 | 2/2021 | Karame | |
| 2021/0064388 | A1 | 3/2021 | Gardner | |
| 2021/0089941 | A1 | 3/2021 | Chen | |
| 2021/0141708 | A1* | 5/2021 | Mathur | G06F 11/323 |
| 2021/0209512 | A1 | 7/2021 | Gaddam | |
| 2021/0224684 | A1 | 7/2021 | Sarkar | |
| 2022/0027792 | A1 | 1/2022 | Cummings | |
| 2022/0078637 | A1 | 3/2022 | Tullberg | |
| 2022/0166782 | A1 | 5/2022 | Zoldi | |
| 2022/0300857 | A1 | 9/2022 | Lavid Ben Lulu | |
| 2023/0030136 | A1 | 2/2023 | Lancioni | |
| 2023/0032822 | A1 | 2/2023 | Wang | |
| 2023/0198855 | A1 | 6/2023 | Ganesan | |
| 2023/0205158 | A1 | 6/2023 | Ramanasankaran | |
| 2023/0274003 | A1 | 8/2023 | Liu | |
| 2023/0368074 | A1 | 11/2023 | Mallya | |
| 2024/0029078 | A1* | 1/2024 | Aurongzeb | G06F 1/3296 |
| 2024/0134972 | A1 | 4/2024 | Boué | |
| 2024/0185090 | A1 | 6/2024 | Rafferty | |
| 2024/0195826 | A1 | 6/2024 | Mathews et al. | |
| 2024/0202405 | A1 | 6/2024 | Lang | |
| 2024/0250975 | A1 | 7/2024 | Pourahmadi | |
| 2024/0273184 | A1* | 8/2024 | Yarabolu | G06F 21/55 |
| 2024/0394419 | A1 | 11/2024 | Patzlaff | |
| 2025/0013913 | A1 | 1/2025 | Boué | |
| 2025/0037022 | A1 | 1/2025 | Aggarwal | |
| 2025/0077659 | A1 | 3/2025 | Ezrielev | |
| 2025/0078449 | A1 | 3/2025 | Omi | |
| 2025/0181358 | A1* | 6/2025 | Bilal | G06F 9/44505 |
| 2025/0212160 | A1 | 6/2025 | Chen | |
| 2025/0342389 | A1* | 11/2025 | Rosen | G06N 20/00 |
| 2026/0030061 | A1* | 1/2026 | Chen | G06F 9/5027 |

FOREIGN PATENT DOCUMENTS

| | | | |
|---|---|---|---|
| WO | 2020/123985 | A | 6/2020 |
| WO | 2021167733 | A1 | 8/2021 |
| WO | 2022115623 | A1 | 6/2022 |

OTHER PUBLICATIONS

Joshi, Naveen, "Is The Data Used For Training Your Machine Learning Model Safe?" Technology For You, Jul. 28, 2022, Web Page <https://www.technologyforyou.org/is-the-data-used-for-training-your-machine-learning-model-safe/> accessed on Sep. 1, 2022 (3 Pages).

Di, Jimmy Z., et al. "Hidden poison: Machine unlearning enables camouflaged poisoning attacks." NeurIPS ML Safety Workshop. 2022. (28 Pages).

Wang, Siruo, et al., "Methods for correcting inference based on outcomes predicted by machine learning." Proceedings of the National Academy of Sciences 117.48 (2020): 30266-30275. (10 Pages).

Rauschmayr, Nathalie, et al., "Detecting and analyzing incorrect model predictions with Amazon SageMaker Model Monitor and Debugger," Amazon Web Services, Jul. 9, 2020, Web Page <https://aws.amazon.com/blogs/machine-learning/detecting-and-analyzing-incorrect-model-predictions-with-amazon-sagemaker-model-monitor-and-debugger/> accessed on Sep. 1, 2022 (13 Pages).

Jackson Higgins, Kelly, "Honeypot Stings Attackers With Counter-attacks," DarkReading, Mar. 26, 2013, Web Page <https://www.darkreading.com/vulnerabilities-threats/honeypot-stings-attackers-with-counterattacks> accessed on Sep. 1, 2022 (4 Pages).

Susmelj, Igor, "The Data You Don't Need: Removing Redundant Samples," Towards Data Science, Mar. 19, 2020, Web Page <https://towardsdatascience.com/the-data-you-don-t-need-removing-redundant-samples-6bfd07c1516c> accessed on Sep. 1, 2022 (10 Pages).

Aghakhani, Hojjat, et al. "Bullseye polytope: A scalable clean-label poisoning attack with improved transferability." 2021 IEEE European symposium on security and privacy (EuroS&P). IEEE, 2021. (20 Pages).

Zhibo Wang et al., "Threats to Training: A Survey of Poisoning Attacks and Defenses on Machine Learning Systems." ACM Computing Surveys, vol. 55, No. 7, Article 134. Dec. 2022: pp. 1-36. (Year: 2022).

Naveen Joshi, "Is The Data Used for Training Your Machine Learning Model Safe", Technology For You. Jul. 28, 2022, Retrieved from <https://www.technologyforyou.org/is-the-data-used-for-training-your-machine-learning-model-safe/> dated Sep. 1, 2022 (3 pages).

* cited by examiner

START

Make an identification that a portion of a training dataset is poisoned.
Operation 350

Identify the last known good instance of the AI model.
Operation 352

Obtain an updated instance of the AI model using the last known good instance
of the AI model and an updated training dataset.
Operation 354

END

MANAGING IMPACT OF POISONED INFERENCES ON DEPLOYMENTS OF HARDWARE TO DOWNSTREAM CONSUMERS

FIELD

Embodiments disclosed herein relate generally to artificial intelligence (AI) models. More particularly, embodiments disclosed herein relate to systems and methods to manage impact of inferences generated by AI models on decisions made by downstream consumers 7 of the inferences.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1:
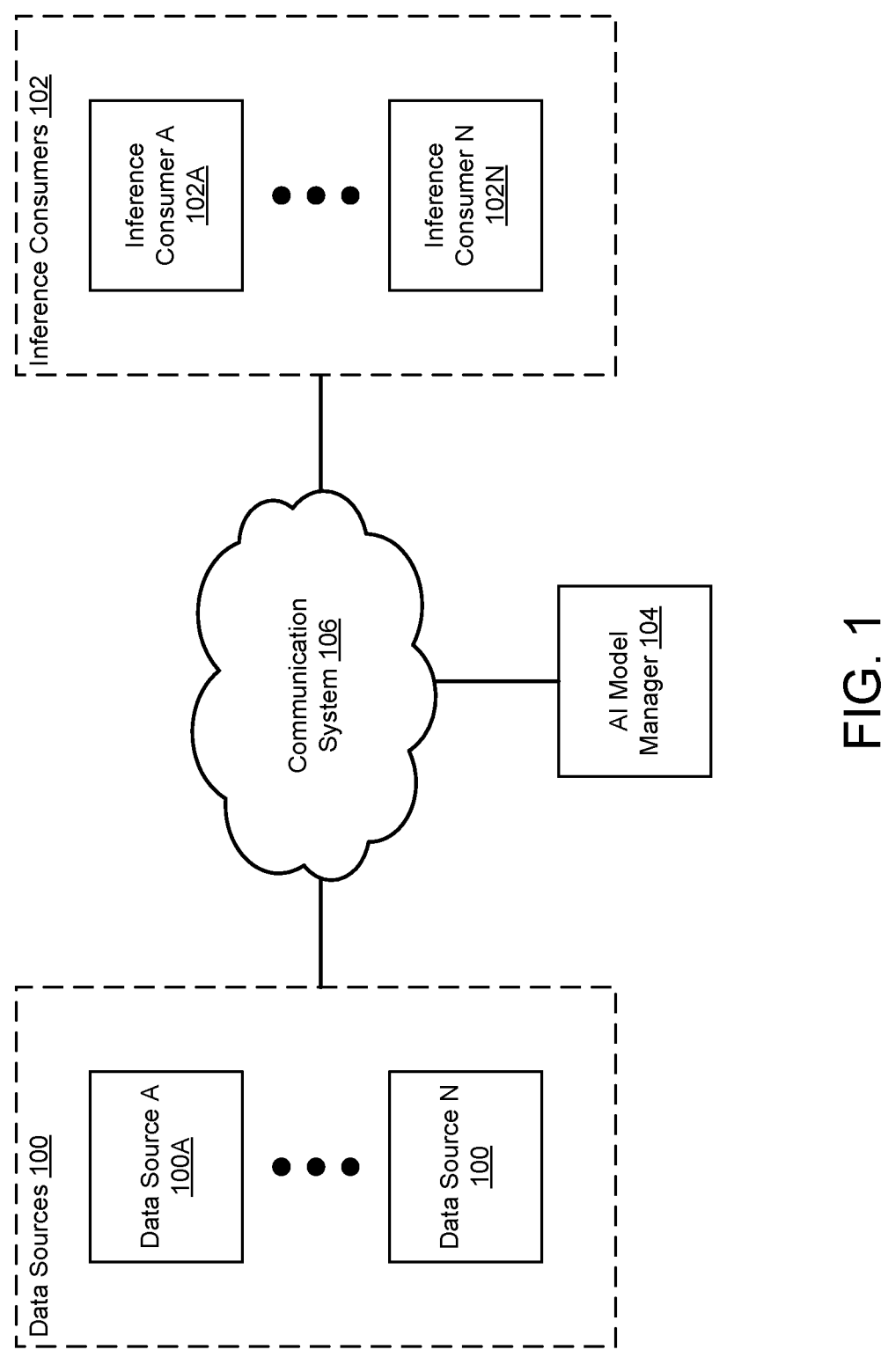
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing impact of inferences generated by AI models on decisions made by inference consumers. Trained AI models may provide computer-implemented services (e.g., inference generation) for downstream consumers of the inferences (e.g., inference consumers). To manage trained AI models, a data processing system may, over time, update AI models through training using training data. However, if poisoned training data is introduced to an AI model, the AI model may become untrustworthy (e.g., the AI model may be tainted by the poisoned training data). Inferences generated using the tainted (e.g., poisoned) AI model may also be untrustworthy or inaccurate.

Once it has been discovered that an AI model has been tainted with poisoned training data, the model may require re-training to remove the influence of the poisoned training data, and any or all inferences generated using the tainted AI model may be untrustworthy. Training an AI model may be a computationally expensive process and may require the use of a limited amount of computing resources that may otherwise be used for inference generation (and/or other purposes). In other words, computing resources spent re-training AI models may interrupt inference consumption and/or other types of computer-implemented services that may otherwise be provided using the computing resources dedicated to re-training.

To reduce computing resources spent re-training AI models, an AI model snapshot may be obtained periodically throughout the AI model training process. The snapshot may store information regarding the structure of the AI model, which may be used to restore a partially trained untainted AI model. The restored AI model may require additional training using only a subset of the original training dataset, thereby requiring fewer computational resources than re-training an AI model from scratch using the entire training dataset. Thus, reverting to a previous instance of the AI model and training to reduce the impact of poisoned training data may require less resource expenditure than re-training an AI model from scratch.

Although the poisoned (e.g., tainted) AI model may be re-trained, poisoned inferences generated by the poisoned AI model may have already been provided to the inference consumer. Poisoned inferences may affect operation of the inference consumer and/or may impact decisions regarding computer-implemented services provided by (and/or provided to) the inference consumer immediately and over time (via use of any decisions made based on the poisoned inferences to make future decisions). For example, an inference consumer may make decisions regarding hardware deployments for customers based on the poisoned inferences. Specifically, the inference consumer may identify a deployment of hardware (e.g., a list of hardware components to ship to the customer to perform a desired process) and the hardware components chosen may not align with the needs of the customer due to the poisoned inference.

However, replacing the deployed hardware components may impact the overall performance of the deployment (e.g., due to downtime of the hardware components during replacement of the previously deployed hardware components), may increase a financial cost to the inference consumer, may consume an undesirable quantity of computing resources by the inference consumer and/or the customer, etc.

To determine whether to modify the deployed hardware (e.g., via addition of at least one hardware component, etc.), a performance cost may be estimated for the deployed hardware components. The performance cost may indicate an estimated deviation between operation of the deployed hardware components and operation of hardware components that may have been deployed based on an unpoisoned inference (e.g., hardware components more closely aligned with the needs of the customer).

If the performance cost meets a performance cost threshold, an action set may be performed to manage the operation of the deployed hardware components. The action set may include deploying at least one additional hardware component to the customer to bring the operation of the deployed hardware components closer to the operation of the hardware components that may have been deployed based on the unpoisoned inference. If the performance cost does not meet the threshold, the action set may not be performed.

By doing so, embodiments disclosed herein may provide a system for managing AI models in which the impact of poisoned inferences generated using a poisoned AI model may be computationally efficiently mitigated. By evaluating the performance cost associated with decisions made based on poisoned inferences, the computational resources, financial resources, energy consumption, and network bandwidth consumption typically associated with replacing hardware components may be reduced.

In an embodiment, a method of managing an impact of poisoned inferences on downstream consumers is provided. The method may include: making an identification that a decision by a downstream consumer of the downstream consumers was made based on a poisoned inference of the poisoned inferences, the poisoned inference being generated by a poisoned artificial intelligence (AI) model; estimating a performance cost for the decision based on at least a first operation of a first deployment due to the decision; making a determination regarding whether the performance cost meets a performance cost threshold; and in an instance of the determination in which the performance cost meets the performance cost threshold: performing an action set to manage the first operation of the first deployment by adding at least one additional hardware component to the first deployment.

The decision may include identifying first hardware components for the first deployment using the poisoned inference and deploying instances of the first hardware components to obtain the first deployment for use by the downstream consumer.

Estimating the performance cost for the decision may include: identifying hardware components for a second deployment using an unpoisoned inference, the unpoisoned inference being a replacement inference for the poisoned inference and generated using an unpoisoned instance of the AI model; obtaining a deviation between the first operation of the first deployment and a second operation of the second deployment; obtaining a confidence score for the deviation, the confidence score indicating a level of uncertainty associated with the first operation and/or the second operation; and treating the deviation and the confidence score as the performance cost.

The second deployment may include second hardware components, the second hardware components being based on a retrospective assessment of needs of the downstream consumer at a time the poisoned inference was made.

Making the determination may include: making a first comparison between the confidence score and a confidence score threshold; and in a first instance of the first comparison in which the confidence score does not meet the confidence score threshold: concluding that the performance cost does not meet the performance cost threshold.

Making the determination may also include: in a second instance of the first comparison in which the confidence score meets the confidence score threshold: making a second comparison between the deviation and a deviation threshold; in a first instance of the second comparison in which the deviation meets the deviation threshold: concluding that the performance cost meets the performance cost threshold; and in a second instance of the second comparison in which the deviation does not meet the deviation threshold: concluding that the performance cost does not meet the performance cost threshold.

Performing the action set may include: identifying a third deployment based, at least in part, on the second deployment; and modifying the first deployment based on the third deployment by adding the at least one additional hardware component to the first deployment.

The third deployment may be identified at least in part using a global optimization process that considers the performance cost, a financial cost for adding the at least one additional hardware component to the first deployment, and a reduction in the performance cost due to addition of the at least one additional hardware component to the first deployment.

Modifying the first deployment may include shipping the at least one additional hardware component to the first deployment and installing the at least one additional hardware component with the first hardware components of the first deployment.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services that may utilize AI models as part of the provided computer-implemented services.

The AI models may include, for example, linear regression models, deep neural network models, and/or other types of AI models. The AI models may be used for various purposes. For example, the AI models may be trained to recognize patterns, automate tasks, and/or make decisions.

The computer-implemented services may include any type and quantity of computer-implemented services. The computer-implemented services may be provided by, for example, data sources 100, AI model manager 104, inference consumers 102, and/or any other type of devices (not shown in FIG. 1). Any of the computer-implemented services may be performed, at least in part, using AI models and/or inferences obtained with the AI models.

For example, inferences generated by AI models may be used by the system of FIG. 1 to identify hardware components to ship to customers. The inferences may indicate, based on processes desired to be performed (e.g., goals of the customers), which hardware components to select for deployment.

Data sources 100 may obtain (i) training data usable to train AI models, and/or (ii) ingest data that is ingestible into trained AI models to obtain corresponding inferences.

To obtain AI models, AI model manager 104 may (i) initiate the training of an instance of an AI model using the training data, and/or (ii) obtain inferences using a trained AI model instance and the ingest data. Both of these tasks may consume computing resources. AI model manager 104 may have access to a finite number of computing resources (e.g., processors, memory modules, storage devices, etc.), and/or may determine at any point in time which computing resources should be allocated to training an instance of the AI model, using the AI model to generate inferences, and/or any other task related to AI models.

Inference consumers 102 may provide, all or a portion, of the computer-implemented services. When doing so, inference consumers 102 may consume inferences obtained by AI model manager 104 (and/or other entities using AI models managed by AI model manager 104). However, if inferences from AI models are unavailable, then inference consumers 102 may be unable to provide, at least in part, the computer-implemented services, may provide less desirable computer-implemented services, and/or may otherwise be impacted in an undesirable manner. For example, if AI model manager 104 is providing inferences relied upon by inference consumers 102, then inference consumers 102 may be deprived of the inferences when the limited computing resources of AI model manager 104 are allocated to training an AI model instance rather than obtaining inferences.

Inference consumers 102 may also include devices managed by any number of customers throughout the distributed environment. The customers may be, for example, any entities that receive computer-implemented services from inference consumers 102. Specifically, customers may include entities that receive shipments of hardware components based on inferences obtained by inference consumers 102.

Over time, new versions of the AI models may be obtained. The new versions of the AI models may be obtained, for example, due to requests from inference consumers 102, acquisition of additional training data that may improve the accuracy of inferences provided by the AI models, and/or for other reasons.

To obtain the new AI models, existing AI models may be used as a basis for new AI models thereby leveraging the existing resource expenditures used to obtain the existing AI models. For example, updated instances of the AI models may be obtained through training as more training data is obtained (e.g., incremental learning).

Training of AI models may be computationally costly because training may require significant resource expenditures. However, the introduction of malicious or poisoned training data can in turn, poison the new AI model instance, any inferences obtained from the poisoned AI model instance, and further poison other AI model instances derived from the new AI model instance.

To manage a trained instance of an AI model, the system of FIG. 1 may include AI model manager 104. AI model manager 104 may (i) obtain an AI model, (ii) obtain a training dataset or an ingest dataset, (iii) obtain a trained AI model instance, (iv) obtain an inference from the trained AI model instance, (v) provide access to the inference to other entities, (vi) update the AI model over time when update conditions indicate that the AI model should be updated, and/or (vii) generate snapshots for the AI model as it is updated over time.

In order to obtain a trained AI model instance, AI model manager 104 may obtain an AI model and a training dataset. The training dataset may be obtained through multiple data sources 100. Data sources 100 may include any number of data sources (e.g., 100A, 100N). For example, an AI model may be used for hardware deployment; that is, identifying hardware components to deploy to customers to meet needs of the customers. In this example, the AI model may be a deep learning model type and data sources may include devices managed by one or more customers. A training dataset may be created by collecting lists of hardware components matched with certain processes and/or computing functionalities by a user (e.g., the customers). The training dataset may then be used to train an instance of the AI model.

Further, in order to obtain an inference from the trained AI model instance, other data may be collected from the same data sources 100 or another data source. Continuing with the above example, the ingest dataset may include processes desired to be performed by the customers. An inference (e.g., a hardware deployment capable of performing the desired processes) may be obtained from the trained instance of the AI model after ingesting the ingest dataset, and the inference may be distributed to inference consumers 102.

The snapshots generated throughout the life of the AI model may include full snapshots and/or incremental snapshots. A full snapshot of an AI model at a given time may include any or all information required to rebuild the AI model for the given time (e.g., the entire AI model structure, all neuron weights, all connections, etc.). However, an incremental snapshot of an AI model at a given time may only include a subset of the information stored in the full snapshot (e.g., only the neuron weights that have changed since the last full snapshot, data values from a training data set used to generate the snapshot through re-training a prior instance of the AI model, etc.). Using incremental snapshots may improve efficiency as they may use fewer computing resources (e.g., data transfer and/or data storage) than a full snapshot. Generating snapshots of the AI model over time may allow for the impact of poisoned data to be computationally efficiently quantified and/or mitigated.

In addition, provision of poisoned inferences to inference consumers 102 may impact decisions made by inference consumers 102. For example, inference consumers 102 may utilize inferences generated by AI models to identify hardware components to deploy to customers to meet computing needs of the customers. A deployment of hardware components may be influenced by poisoned inferences and, therefore, may not meet the computing needs of the customer. Consequently, the decisions made by inference consumers 102 and operation of deployments from inference consumers 102 may be impacted in a manner that causes undesirable and/or less useful computer-implemented services to be provided by inference consumers 102 to customers, etc.

In general, embodiments disclosed herein may provide methods, systems, and/or devices for managing an impact of inferences generated by AI models on decisions made by downstream consumers (e.g., inference consumers). The inferences and/or the AI models may be managed in a manner that allows for decisions made based on poisoned inferences to be evaluated and (potentially) modified in a computationally efficient manner. By doing so, the system may be more likely to provide desired computer-implemented services due to improved access to resources (e.g., computing resources, financial resources, time resources, etc.).

To manage the impact of poisoned inferences on inference consumers 102, AI model manager 104 may: (i) make an identification that a decision by a downstream consumer was made based on a poisoned inference, (ii) estimate a performance cost for the decision based on at least a first operation of a first deployment due to the decision, and/or (iii) determine whether the performance cost meets a performance cost threshold. If the performance cost meets the performance cost threshold, AI model manager 104 may perform an action set to manage the first operation of the first deployment by adding at least one hardware component to the first deployment.

The decision made by a downstream consumer (e.g., one or more of inference consumers 102) may include identifying first hardware components to be included in the first deployment. Specifically, the poisoned inference (and/or additional information including other inferences) may be used in conjunction with the needs of a customer to determine which hardware components to deploy to the customer. Other criteria may be used to determine which hardware components to include in the deployment without departing from embodiments disclosed herein.

To estimate the performance cost, AI model manager 104 may compare a first operation of the first deployment to a second operation of a second deployment. The first operation may indicate estimated functionality (e.g., processor speed, storage capacity, etc.) and/or other capabilities of the first deployment. The first operation may indicate an ability for the hardware components to achieve a goal the system has been tasked with.

For example, the customer may desire the hardware components to perform processes for managing a database including images and video footage. The first operation may, therefore, include: (i) a transaction rate for a processor of the hardware components (e.g., a number of times data can be read from the database per unit time), (ii) a storage capacity of the hardware components (e.g., an amount of video footage that can be encoded per unit time), (iii) bandwidth consumption of a communication network used by the hardware components (e.g., how many video streams that can be concurrently delivered), and/or (iv) other data indicating functionality of the hardware components of the first deployment.

The first operation may be an estimate of the capabilities of the first deployment, as the actual performance may depend on conditions specific to the environment in which the first deployment may operate. Consequently, a first confidence score may be obtained along with the estimated first operation, the first confidence score indicating a level of uncertainty associated with the first operation.

The second deployment may include a list of hardware components that may have been selected for deployment if an unpoisoned inference had been used in place of the poisoned inference. Therefore, the second deployment may include a set of hardware components that most closely match the needs of the customer (e.g., processor speeds, storage capacity, network bandwidth consumption, etc. to perform certain processes).

The second operation may also be an estimate of the capabilities of the second deployment, as the actual performance may depend on conditions specific to the environment in which the second deployment may operate. Consequently, a second confidence score may be obtained along with the estimated second operation, the second confidence score indicating a level of uncertainty associated with the second operation.

To obtain the second deployment, a replacement inference for the poisoned inference may be generated by an unpoisoned instance of the AI model. The unpoisoned instance of the AI model may be obtained by: (i) un-training a poisoned instance of the AI model and re-training the un-trained model using a portion of the available training data, (ii) selecting a last good (e.g., unpoisoned) instance of the AI model and training the last good instance of the AI model using available unpoisoned training data, and/or (iii) via other methods. The second operation may, therefore, indicate functionality of the hardware components included in the second deployment.

By comparing the first operation to the second operation, a deviation may be obtained. In addition, a confidence score may be obtained for the deviation. The confidence score for the deviation may be obtained by aggregating the first confidence score and the second confidence score (e.g., by adding them, calculating an average, etc.).

The deviation and the confidence score for the deviation may be treated as the performance cost for the first deployment. To determine whether the performance cost meets the performance cost threshold, the confidence score for the deviation may be compared to a confidence score threshold and the deviation may be compared to a deviation threshold. If the confidence score does not meet the confidence score threshold (e.g., the confidence is too low), the performance cost may be considered as not meeting the performance cost threshold and the action set may not be performed.

If the confidence score meets the confidence score threshold (e.g., the confidence is sufficient), the deviation may be compared to the deviation threshold. If the deviation meets the deviation threshold (e.g., the deviation is too large), the performance cost may be treated as meeting the performance cost threshold and the action set may be performed. If the deviation does not meet the deviation threshold, the performance cost may be treated as not meeting the performance cost threshold and the action set may not be performed.

The action set may include, for example, modifying the first deployment to better suit the needs of the customer by deploying at least one additional hardware component to the customer. However, identifying the best possible deployment (e.g., the second deployment) and re-deploying hardware components to the customer may be computationally and financially costly.

To improve the operation of the first deployment without completely replacing the hardware components of the first deployment, the action set may include performing a global optimization process that takes into account the performance cost, a financial cost for adding additional hardware components to the first deployment, a reduction in the performance cost due to the addition of additional hardware components, etc. The global optimization process may result in identification of a third deployment, the third deployment being intended to bring the first operation closer to the second operation via addition of at least one hardware component to the first deployment.

The action set may also include, for example, shipping the at least one hardware component to the first deployment and installing the at least one additional hardware component with the first hardware components to provide the third deployment to the customer.

By doing so, embodiments disclosed herein may provide methods for managing an impact of poisoned inferences on decisions made by downstream consumers of the inferences by managing operation of deployments of hardware based on poisoned inferences.

Inference consumers 102 may include any number of inference consumers (e.g., 102A, 102N). Inference consumers 102 may include businesses, individuals, or computers that may use the inference data to improve and/or automate decision-making. Inference consumers 102 may offer deployments of hardware to customers based on inferences. In addition, inference consumers 102 may include any number of consumers to which other inference consumers of inference consumers 102 may provide the hardware deployments to.

When performing its functionality, one or more of AI model manager 104, data sources 100, and inference consumers 102 may perform all, or a portion, of the methods and/or actions shown in FIGS. 2A-3C.

Any of AI model manager 104, data sources 100, and inference consumers 102 may be implemented using a computing device (e.g., a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 106.

Communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

Communication system 106 may be implemented with one or more local communications links (e.g., a bus interconnecting a processor of AI model manager 104 and any of the data sources 100, and inference consumers 102).

While illustrated in FIG. 1 as included a limited number of specific components, a system in accordance with an embodiment may include fewer, additional, and/or different components than those illustrated therein.

The system described in FIG. 1 may be used to reduce the computational cost for mitigating the impact of poisoned inferences on inference consumers. The following operations described in FIGS. 2A-2C may be performed by the system in FIG. 1 when providing this functionality.

Figure 2A:
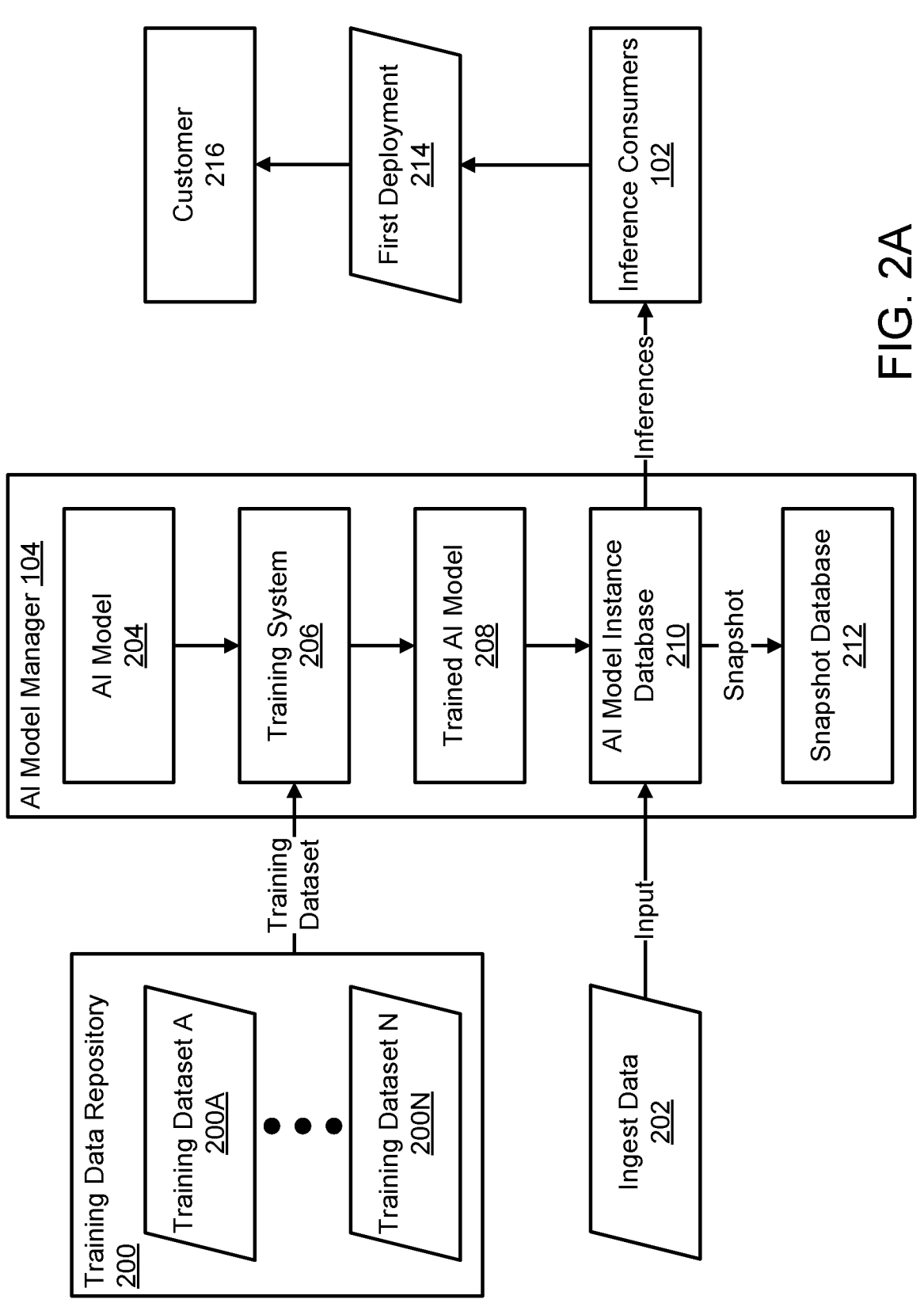
FIG. 2A shows a data flow diagram illustrating an AI model manager in accordance with an embodiment.

FIG. 2A shows a data flow diagram of an AI model manager in accordance with an embodiment. The data flow diagram may illustrate generation and use of AI models in a system similar to that of FIG. 1. As noted with respect to FIG. 1, the AI models may be used to obtain inferences, which may be used to provide computer-implemented services. For example, inference consumers 102 may perform hardware deployment services. Hardware deployment services may be provided by using AI models that have been trained to identify hardware components for deployment to customers (e.g., customer 216) based on the computing goals (e.g., tasks to be performed by the hardware components deployed) of the customer.

As discussed with respect to FIG. 1, training data used for training AI models may be obtained from any number of data sources 100 (not shown in FIG. 2A). Training data may be stored in training data repository 200. Training data repository 200 may include any number of training datasets (e.g., 200A, 200N).

Training data repository 200 may include data that defines an association between two pieces of information (e.g., which may be referred to as "labeled data"). For example, in the context of hardware deployments, training data repository 200 may include records of hardware components that have been deployed to perform certain tasks. The relationship between the identified hardware components and the tasks may be a portion of labeled data. Any of the training datasets (e.g., 200A) from training data repository 200 may relate the hardware components used by a customer to computing processes (e.g., the tasks) performed using the hardware components thereby including any number of portions of labeled data.

Data sources 100 may also provide ingest data 202. Ingest data 202 may be a portion of data for which an inference is desired to be obtained. Ingest data 202 may not be labeled data and, thus, an association for ingest data 202 may not be known. For example, returning to the hardware deployment example, ingest data 202 may include goals desired to be achieved using hardware components (e.g., the tasks) by customer 216. Ingest data 202 may be used by AI model manager 104 to obtain an inference indicating which hardware components are most capable of achieving the goals (e.g., through ingestion by an AI model).

One task may include, for example, achieving a certain storage capacity for a database. Therefore, the input for the AI model may include the desired storage capacity and the output from the AI model (e.g., the inference) may include a storage architecture capable of achieving the desired storage capacity.

AI model manager 104 may provide inferences for ingest data, such as ingest data 202. To do so, AI model manager 104 may include AI model 204 and training system 206. AI model 204 may be trained by training system 206 using a training dataset (e.g., training dataset 200A). For example, training system 206 may employ supervised learning using a training dataset that includes sample input data along with its desired output data (e.g., the pair being labeled data).

Once trained, trained AI model 208 may attempt to map the sample input data to the desired output data, as well as make inferences based on ingest data 202 that may differ from the sample data used to train trained AI model 208. In the context of the hardware deployment services example, trained AI model 208 may be an AI model trained to compile lists of hardware components capable of performing desired computing processes when given the desired computing processes (and/or other constraints) as ingest data.

To provide hardware deployment services, AI model manager 104 may train any number of AI models which may generate inferences usable to generate the lists of hardware components. To manage the trained AI models, the trained AI models (e.g., including trained AI model 208 and/or other trained AI models) may be stored in AI model instance database 210. AI model instance database 210 may include any number of trained AI model instances (e.g., trained AI model 208, other trained AI models that are not shown in FIG. 2A).

To generate inferences using the trained AI models, AI model instance database 210 (and/or other entities not shown) may receive ingest data 202. Ingest data 202 may be used to select one or more trained AI models to use to infer the hardware components usable to perform the computing processes suggested in ingest data 202.

Once selected, ingest data 202 may be input to a trained AI model instance to generate an inference. AI model manager 104 may obtain the inference, which may be provided to inference consumers 102. In the hardware deployment example, a desired computing process to be completed may be input to the trained AI model, and the hardware components for the deployment may be obtained by AI model manager 104, and the hardware components for the deployment may be provided to a customer.

Over time, the AI models of AI model instance database 210 may need to be updated for a variety of reasons. For example, the trained AI models may become inaccurate, may not provide desired types of inferences, etc. Consequently, the trained AI models of AI model instance database 210 may be replaced and/or updated.

To reduce the likelihood of replacement or updating of trained AI models resulting in undesired outcomes (e.g., due to poisoning), snapshots for the trained AI models may be obtained. AI model manager 104 may obtain a snapshot of a trained AI model instance from AI model instance database 210. The snapshot may be stored by snapshot database 212. The snapshot may be stored by snapshot database 212 by: sending the snapshot to snapshot database 212 and storing the snapshot in a non-transitory storage medium.

Snapshot database 212 may include any number of snapshots of AI model instances. The snapshots of the AI model instances may include information regarding the structure of an AI model instance, information regarding inferences obtained from the AI model instance, information regarding the training datasets used to train the AI model instance, and/or other information. The snapshots of snapshot database 212 may include full snapshots (e.g., including all structural information for the snapshot) and/or incremental snapshots (e.g., including only structural elements of the AI model that have changed since the previous snapshot, etc.).

Thus, as illustrated in FIG. 2A, the system of FIG. 1 may provide inferences using trained AI models to inference consumers 102. Inference consumers 102 may subsequently utilize the inferences to obtain first deployment 214. If, for example, the inference includes a list of hardware components recommended to meet computing needs of customer 216, first deployment 214 may include the hardware components from the list of the hardware components. Hardware components of first deployment 214 may include: (i) processors (e.g., central processing units (CPUs), (ii) storage devices (e.g., random-access memory (RAM)), (iii) network interface devices (e.g., wireless transceivers), (iv) other components to facilitate user interaction (e.g., a mouse, a keyboard, a monitor, etc.), and/or (v) other hardware components.

While described herein with respect to computer hardware, it may be appreciated that the hardware components may include other types of hardware (e.g., medical hardware, industrial hardware, infrastructure hardware, etc.) without departing from embodiments disclosed herein.

Customer 216 may obtain first deployment 214 and may utilize first deployment 214 to perform computing tasks. Customer 216 may be an entity similar to any of inference consumers 102 described in FIG. 1. For example, customer 216 may include a device operated by a user requesting deployments from the system of FIG. 1. Customer 216 may intend to use the hardware components of first deployment 214 to achieve goals such as, for example, managing a database of video footage.

However, as noted above, if the trained AI models are poisoned then the trained AI models may no longer be trustworthy for inference generation. A poisoned inference may lead to a deployment (e.g., first deployment 214) being generated by inference consumers 102 that does not meet the needs of customer 216.

Figure 2B:
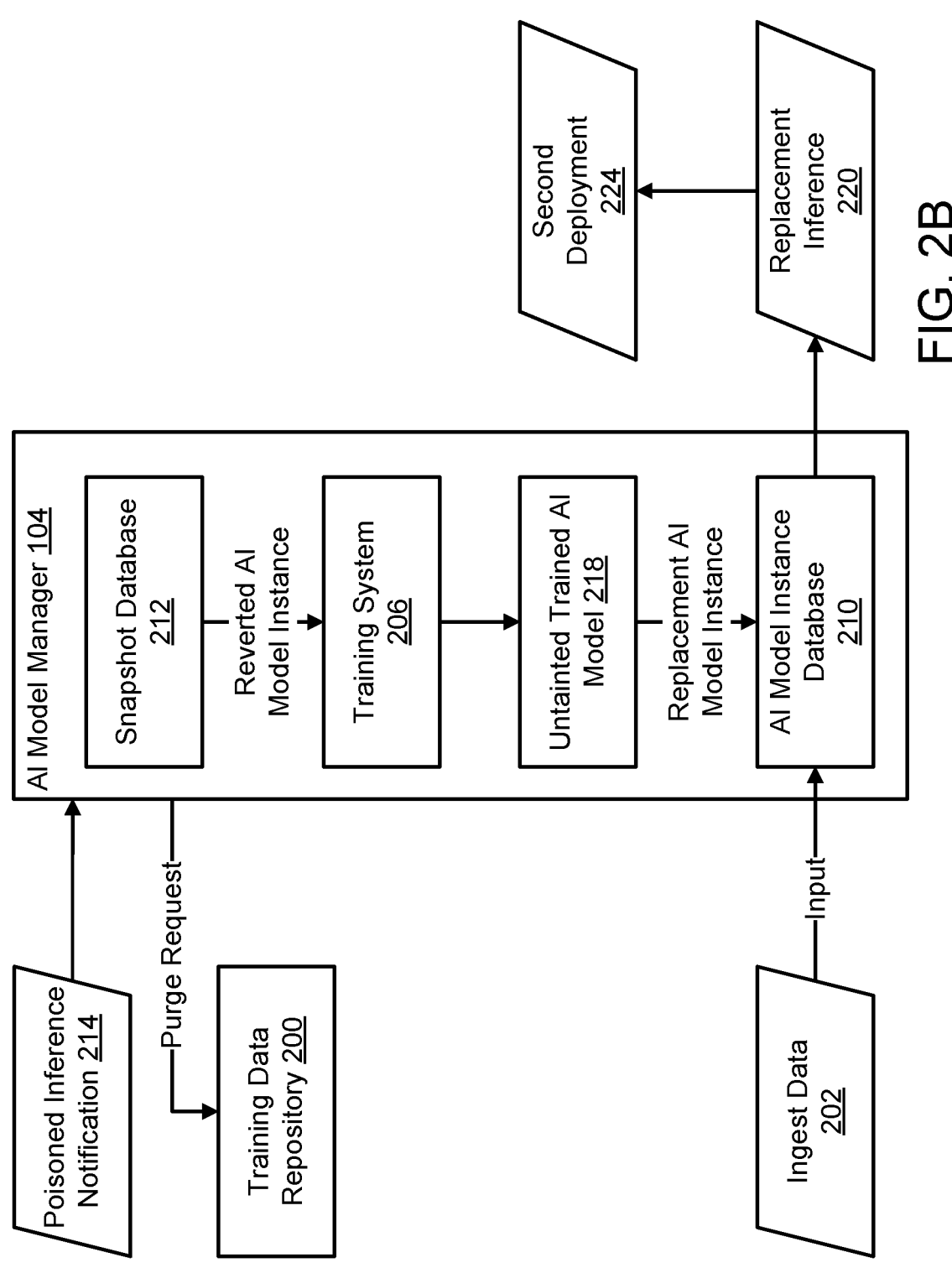
FIG. 2B shows a data flow diagram illustrating an AI model manager generating a replacement inference for a poisoned inference in accordance with an embodiment.

Turning to FIG. 2B, in the event that a poisoned inference is identified, AI model manager 104 may obtain poisoned inference notification 214. Poisoned inference notification 214 may indicate that a decision has been made by inference consumers 102 based on a poisoned inference generated by a poisoned AI model instance. The decision that was made may include: (i) identifying first hardware components for the first deployment using the poisoned inference, and (ii) deploying instances of the first hardware components to obtain the first deployment for use by the downstream consumer (e.g., customer 216).

Poisoned inference notification 214 may also include information that identifies components associated with poisoned AI model, identifiers for the first hardware components, identifiers for customers that received the deployments, etc.

The components of the poisoned AI model may include (i) a poisoned portion of a training dataset that was used to train the poisoned AI model, (ii) a tainted trained AI model instance associated with the poisoned portion of the training dataset, (iii) a poisoned inference associated with the tainted AI model instance, (iv) a time period associated with the poisoning (e.g., the time when the poisoned training data is introduced to the AI model, and/or the time the poisoning is remediated), and/or (v) a data source 100 that supplied the poisoned training data.

A poisoned AI model may be an AI model that has been trained using poisoned training data. Introduction of the poisoned training data may be initiated by an unauthorized entity and the poisoned training data may have content that differs from representations regarding the content made by the unauthorized entity. Specifically, the unauthorized entity (e.g., a malicious entity masquerading as an authorized entity, etc.) may introduce training data that is incorrectly labeled while representing the training data as accurate to AI model manager 104. Therefore, the poisoned portion of the training data set may appear (to inference consumers 102, etc.) to be legitimate and accurately labeled training data provided by an authorized entity.

For example, in the context of hardware deployment services, a poisoned portion of a training dataset may be a list of hardware components that do not provide functionality that aligns with the needs of a customer (e.g., incorrectly labeled). Training an AI model using one or more poisoned training data entries may result in a tainted AI model that misidentifies hardware components for deployment to customers. The tainted AI model may, for example, generate a poisoned inference that leads to a deployment of hardware components to a customer that does not meet the needs of the customer.

Once the components of the poisoned AI model are identified, AI model manager 104 may (i) send a purge request to training data repository 200 regarding the poisoned portion of the training dataset, and/or (ii) revert a tainted AI model instance to a previous AI model instance to mitigate the impact of the components. The previous AI model instance may be a last known good AI model instance, and/or a previous tainted AI model instance trained by poisoned training data. In the case where the AI model instance is tainted, then the tainted AI model instance may later be untrained to eliminate the effect of the poisoned training data.

Rather than reverting to a last known good (e.g., unpoisoned) AI model instance, the tainted AI model may be reverted to a previous tainted (e.g., poisoned) instance of the AI model and the previous tainted instance of the AI model may be un-trained. Doing so may remediate the impact of poisoned training data without performing a re-training process with all available unpoisoned training data, thereby conserving computing resources.

A snapshot of a last known good AI model instance may be stored in snapshot database 212. The last known good AI model instance may be a partially trained AI model instance that has not been trained using the poisoned portion of training data. For example, when an AI model is updated over time (e.g., when additional training data becomes available), the AI model may be sequentially updated using the additional training data. However, once trained with poisoned training data, all subsequent instances of the AI model may remain poisoned (i.e., re-training/updating may not remove the effect of the poisoned training data on the future operation of the trained AI model). The last known good AI model instance may be the last version of the AI model that is trained without using the poisoned training data for updating purposes.

However, reverting the AI model may not entirely remove the impact of the poisoned training data from the overall system operation. For example, the poisoned training data may still be present in training data repository 200. To reduce the impact of poisoned training data, a purge request may prompt the deletion of a poisoned portion of a training dataset from training data repository 200. Any number of poisoned portions of training data may be removed from training data repository 200 to create an updated training data repository (not shown). The updated training data repository may not include any portions of poisoned training data. An updated training dataset from the updated training data repository may be used to train an untainted AI model instance that is trustworthy for inference generation.

To obtain untainted trained AI model 218, training system 206 may use an updated training dataset to train a reverted AI model instance (e.g., a last known good AI model instance). To reduce computational resources during AI model training, the updated training dataset used to train a reverted AI model instance may only include training data not already used to train the reverted AI model instance (e.g., training data input to training system 206 after the poisoned training data). AI model manager may then replace a tainted trained AI model instance stored in AI model instance database 210 with untainted trained AI model 218.

Like removal of the poisoned training data to reduce the impact of the poisoned training data on operation of the system, untainted trained AI model 218 may be used to generate replacement inference 220 for a poisoned inference (e.g., generated by the tainted trained AI model) by ingesting a portion of ingest data 202 (e.g., which may have been used to generate the poisoned inference).

Replacement inference 220 may include, for example, a list of hardware components selected to meet needs of a customer at the time the poisoned inference (e.g., the inferences shown in FIG. 2A) was obtained. Second deployment 224 may include hardware components predicted to meet the needs of a customer (not shown). Second deployment may include hardware components that may have been deployed to customer 216 if the poisoned inference had not been used to generated first deployment 214 in FIG. 2A.

Figure 2C:
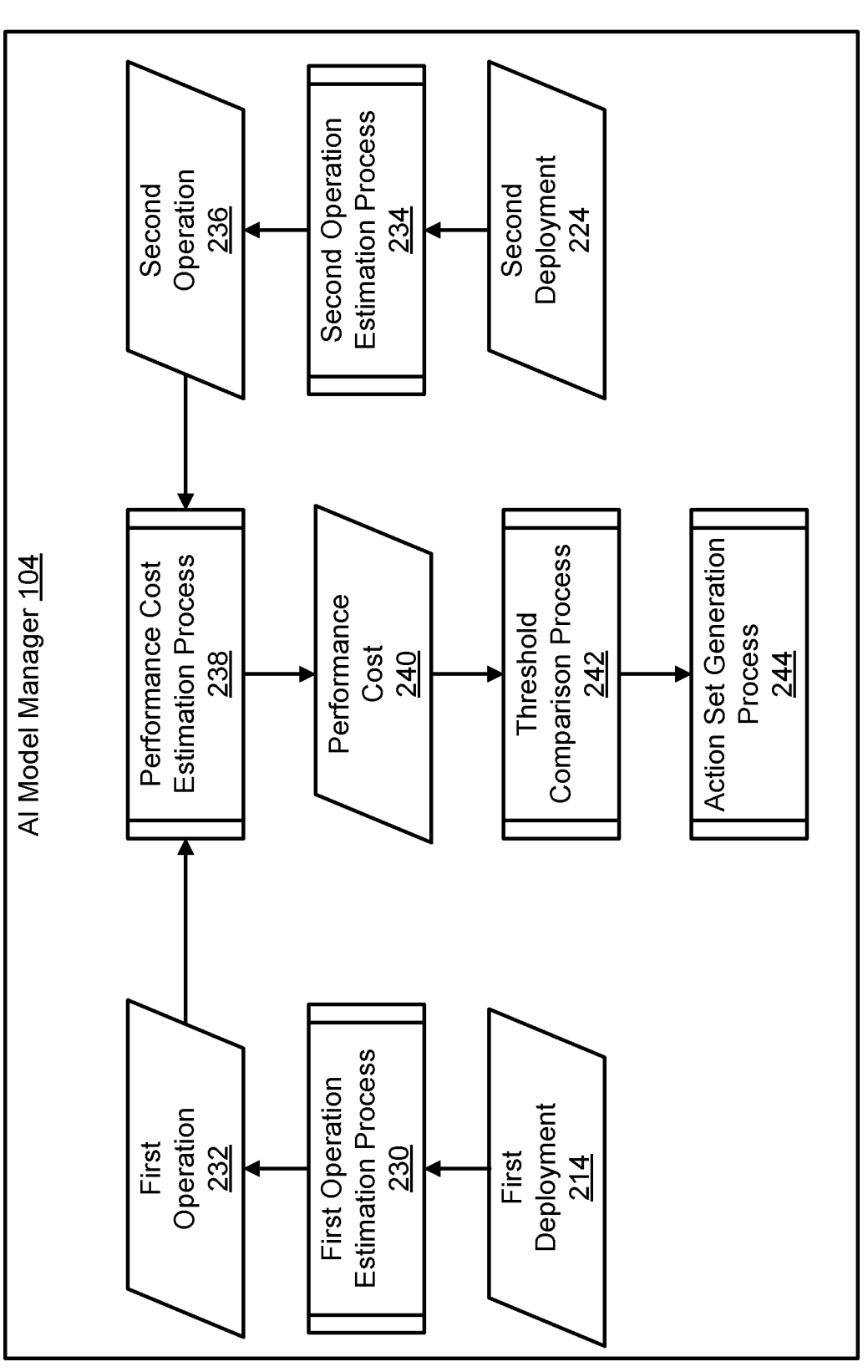
FIG. 2C shows a data flow diagram illustrating an AI model manager managing impact of a poisoned inference on decisions made by an inference consumer in accordance with an embodiment.

Turning to FIG. 2C, a diagram of an AI model manager managing impact of a poisoned inference on an inference consumer in accordance with an embodiment is shown. As previously described in FIG. 2B, AI model manager 104 may make an identification that a poisoned inference has been provided to inference consumers 102 (not shown) and may obtain replacement inference 220 for the poisoned inference. AI model manager 104 may determine whether at least one additional hardware component is to be deployed to customer 216 to bring first deployment 214 closer to compliance with the needs of customer 216.

For example, a customer (e.g., customer 216 described in FIG. 2A) may obtain hardware components from an inference consumer (e.g., inference consumers 102 described in FIG. 1) usable to manage a database of images and video footage. The customer may desire for the database to have a certain storage capacity (e.g., 50 gigabytes (GB)). First deployment 214 may include at least a storage device and a processor. AI model manager 104 may determine, based on operation of the storage device, processor, and/or any additional hardware components of first deployment 214, whether first deployment 214 meets the needs of the customer.

To determine whether hardware components of first deployment 214 meet the needs of the customer, AI model manager 104 may perform first operation estimation process 230 to obtain first operation 232. First operation estimation process 230 may include predicting performance of the hardware components of first deployment 214 when used by the customer. For example, a processor speed may be known for the processor and a storage capacity may be known for the storage device. However, factors specific to the context in which the hardware components are operated may influence the performance of the hardware components.

Therefore, first operation estimation process 230 may include feeding data (e.g., specifications for the hardware components, historical data related to past deployments to the customer, historical data regarding performance of processes by the customer, etc.) into an inference model trained to predict performance of hardware components under certain conditions. First operation estimation process 230 may include other processes to estimate performance of the hardware components without departing from embodiments disclosed herein.

In addition, first operation estimation process 230 may include obtaining a first confidence score (not shown) for first operation 232. The first confidence score may indicate an amount of uncertainty associated with the estimated performance of first operation 232. The first confidence score may be automatically generated by the inference model responsible for generating first operation 232 and may be represented as a percentage of uncertainty associated with an inference.

The performance of first deployment 214 may deviate from performance of second deployment 224 (e.g., hardware components that would have been deployed if an unpoisoned inference had been used instead of a poisoned inference). However, the extent to which first deployment 214 deviates from second deployment 224 may influence whether actions are taken to modify first deployment 214.

Similarly, second operation estimation process 234 may include predicting performance of the hardware components of second deployment 224 when used by the customer. For example, a processor speed may be known for the processor and a storage capacity may be known for the storage device. However, factors specific to the context in which the hardware components are operated may influence the performance of the hardware components.

Therefore, second operation estimation process 234 may include feeding data (e.g., specifications for the hardware components, historical data related to past deployments to the customer, historical data regarding performance of processes by the customer, etc.) into an inference model trained to predict performance of hardware components under certain conditions. Second operation estimation process 234 may include other processes to estimate performance of the hardware components without departing from embodiments disclosed herein.

In addition, second operation estimation process 234 may include obtaining a second confidence score (not shown) for second operation 236. The second confidence score may indicate an amount of uncertainty associated with the estimated performance of second operation 236. The second confidence score may be automatically generated by the inference model responsible for generating second operation 236 and may be represented as a percentage of uncertainty associated with an inference.

Returning to the database example, the storage device deployed as part of first deployment 214 may have a storage capacity of at least 50 GB. However, the processor deployed in first deployment 214 may not have a processing speed that meets the processing speed indicated by second deployment 224. As the storage capacity is sufficient to meet the needs of the customer, no action may be required to modify first deployment 214.

However, if the storage capacity of first deployment 214 is insufficient to meet the needs of the customer (e.g., 20 GB), additional hardware components (e.g., additional storage) may be deployed to the customer to bring functionality of first deployment 214 closer to the functionality of second deployment 224.

To determine whether to take action, AI model manager 104 may perform performance cost estimation process 238. Performance cost estimation process 238 may utilize at least first operation 232 and second operation 236 to obtain performance cost 240. Performance cost 240 may include two components: (i) a deviation between first operation 214 and operation 224 and (ii) a confidence score obtained using the first confidence score for first operation 214 and the second confidence score for second operation 224.

The deviation may include any number of deviations between any number of performance metrics. For example, the deviation may include a storage capacity deviation of 60 GB, a processor speed deviation of 200 megahertz, and/or other deviations. Therefore, the deviation may indicate that hardware components of first deployment 214 have lower storage capacity and processor speed than hardware components of second deployment 224.

Different properties of the deviation (e.g., storage capacity, processor speed, etc.) may be weighted as part of performance cost estimation process 238 to indicate which properties are more important to the customer. For example, storage capacity may be the most important property to the customer and, therefore, the deviation in storage capacity may be associated with a larger weight than processor speed.

The confidence score may be an aggregation of the first confidence score and the second confidence score and may indicate an overall amount of uncertainty associated with performance cost 240. The confidence score may be represented as a numerical quantity, a percentage uncertainty, and/or any other metric. For example, first operation 232 may have a first confidence score of 85% and second operation 232 may have a second confidence score of 90%. The first confidence score and the second confidence score may be averaged to obtain the overall confidence score for the deviation of 87.5%.

Performance cost 240 may be used for threshold comparison process 242 to determine whether to perform an action set to modify first operation 232. Threshold comparison process 242 may include comparing the confidence score for the deviation to a confidence score threshold (not shown). The confidence score threshold may be any threshold chosen by any entity (e.g., the customer, any of inference consumers 102, AI model manager 104, etc.). The confidence score threshold may indicate a minimum confidence score (e.g., corresponding to a maximum amount of uncertainty) in order to proceed with threshold comparison process 242.

For example, the confidence score threshold may be 75% which may indicate that estimated operations of hardware components must have at least a 75% certainty. Therefore, a maximum of 25% uncertainty may be considered acceptable. If the confidence score falls below the confidence score threshold, first operation 232 and/or second operation 236 may be considered too uncertain to perform an action set. Therefore, no action may be taken to modify first deployment 214.

If the confidence score meets the confidence score threshold (e.g., the 87.5% confidence score mentioned above), the deviation may then be compared to a deviation threshold to determine whether the extent of the deviation is sufficient to warrant action by AI model manager 104.

The deviation threshold (not shown) may be any threshold chosen by any entity (e.g., the customer, any of inference consumers 102, AI model manager 104, etc.). The deviation threshold may indicate minimum amount of deviation between first operation 232 and second operation 236 to warrant modification of first deployment 214.

For example, the deviation (e.g., including a storage capacity deviation of 60 GB, a processor speed deviation of 200 megahertz) may correspond to a numerical quantity of 7 on a scale of 1-10 with 1 being a lower amount of deviation than 10. The deviation threshold may be 5. Therefore, any deviation of 5 or above may trigger performance of an action set to modify first deployment 214. In this example, the deficit in processing speed may not be critical to the customer, but the deficit in storage capacity may be critical and may be primarily responsible for the assignment of a deviation of 7.

Therefore, in FIG. 2C, performance cost 240 may meet the performance cost threshold, which may trigger action set generation process 244. Action set generation process 244 may include identifying steps to be taken to modify first deployment 214 to bring performance of the hardware components in first deployment 214 closer to compliance with the needs of the customer.

Deploying all hardware components of second deployment 224 to replace all hardware components of first deployment 214 may be financially costly, may cause downtime of existing hardware components used by the customer, etc. To identify a cost-effective method for modifying first deployment 214, action set generation process 244 may include identifying a third deployment (not shown). The third deployment may include providing at least one additional hardware component usable to supplement the hardware components of first deployment 214. The at least one additional hardware component may bring the functionality of first deployment 214 closer to the functionality of second deployment 224.

The third deployment may be identified using, at least in part, a global optimization process that considers the performance cost, a financial cost for adding the at least one additional hardware component to first deployment 214, and a reduction in the performance cost due to addition of the at least one additional hardware component to first deployment 214.

For example, the global optimization process may consider which hardware components are available to AI model manager 104, how much the available hardware components may cost to deploy, and an extent to which deployment of the available hardware components may decrease the deviation. The global optimization process may attempt to minimize performance cost 240 and the financial cost while maximizing the reduction in performance cost 240.

Action set generation process 244 may also include identifying one or more hardware components of first deployment 214 for removal from first deployment 214 and/or for replacement (with, for example, the at least one additional hardware component described above) in first deployment 214. Action set generation process 244 may identify other actions to take to modify first deployment 214 without departing from embodiments disclosed herein.

Continuing with the example in which a 60 GB deficit in storage capacity exists as part of the deviation, the third deployment may include a storage device to supplement the storage capacity of first deployment 214. However, the deficit in processing speed may not need to be remediated to meet the needs of the consumer and the processor may not be replaced. Consequently, the additional storage device may be shipped to the customer and installed with the hardware components of first deployment 214.

In an embodiment, the one or more entities performing the operations shown in FIGS. 2A-2C are implemented using a processor adapted to execute computing code stored on a persistent storage that when executed by the processor performs the functionality of the system of FIG. 1 discussed throughout this application. The processor may be a hardware processor including circuitry such as, for example, a central processing unit, a processing core, or a microcontroller. The processor may be other types of hardware devices for processing information without departing from embodiments disclosed herein.

Figure 3A:
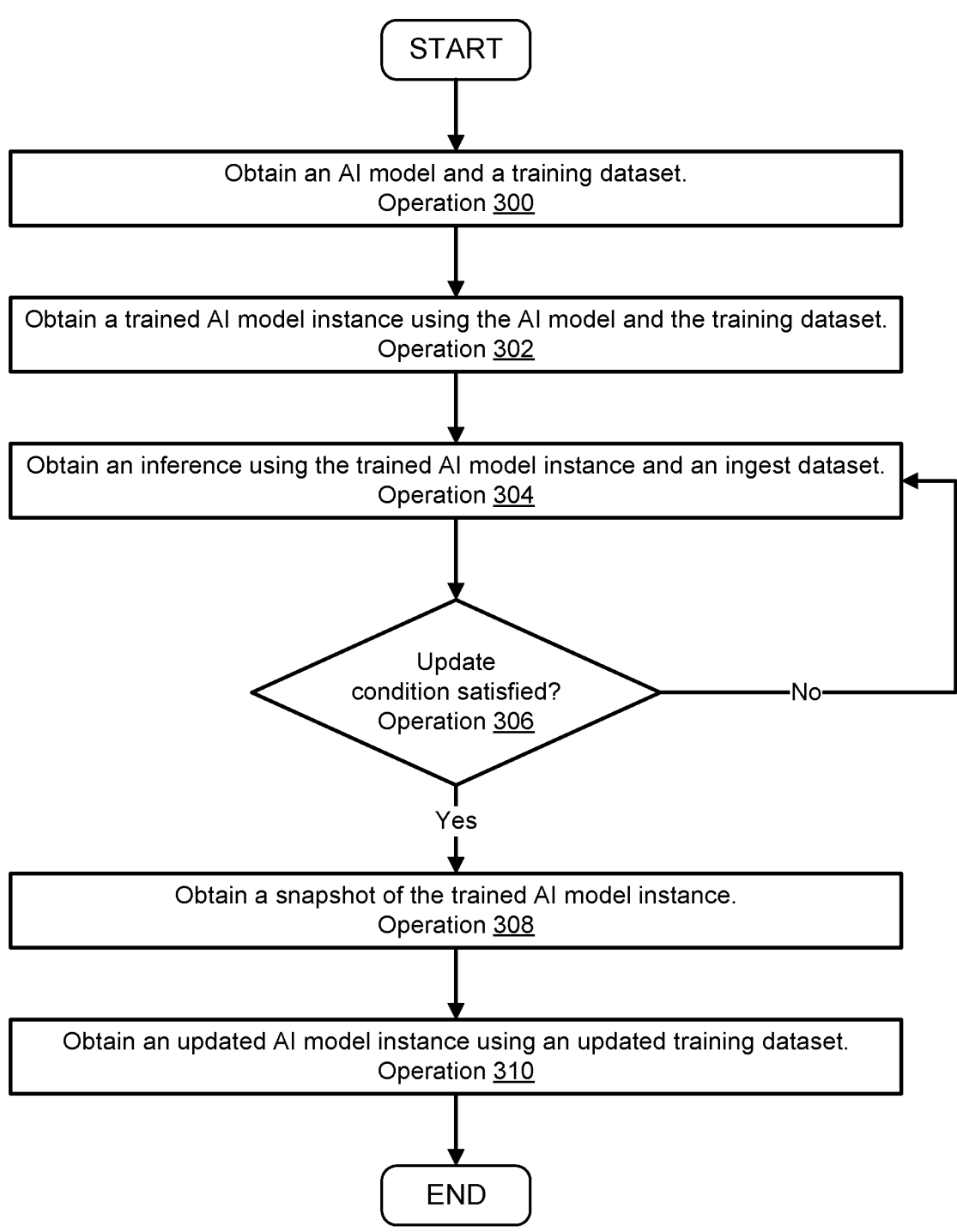
FIG. 3A shows a flow diagram illustrating a method of updating an AI model instance in accordance with an embodiment.
Figure 3B:
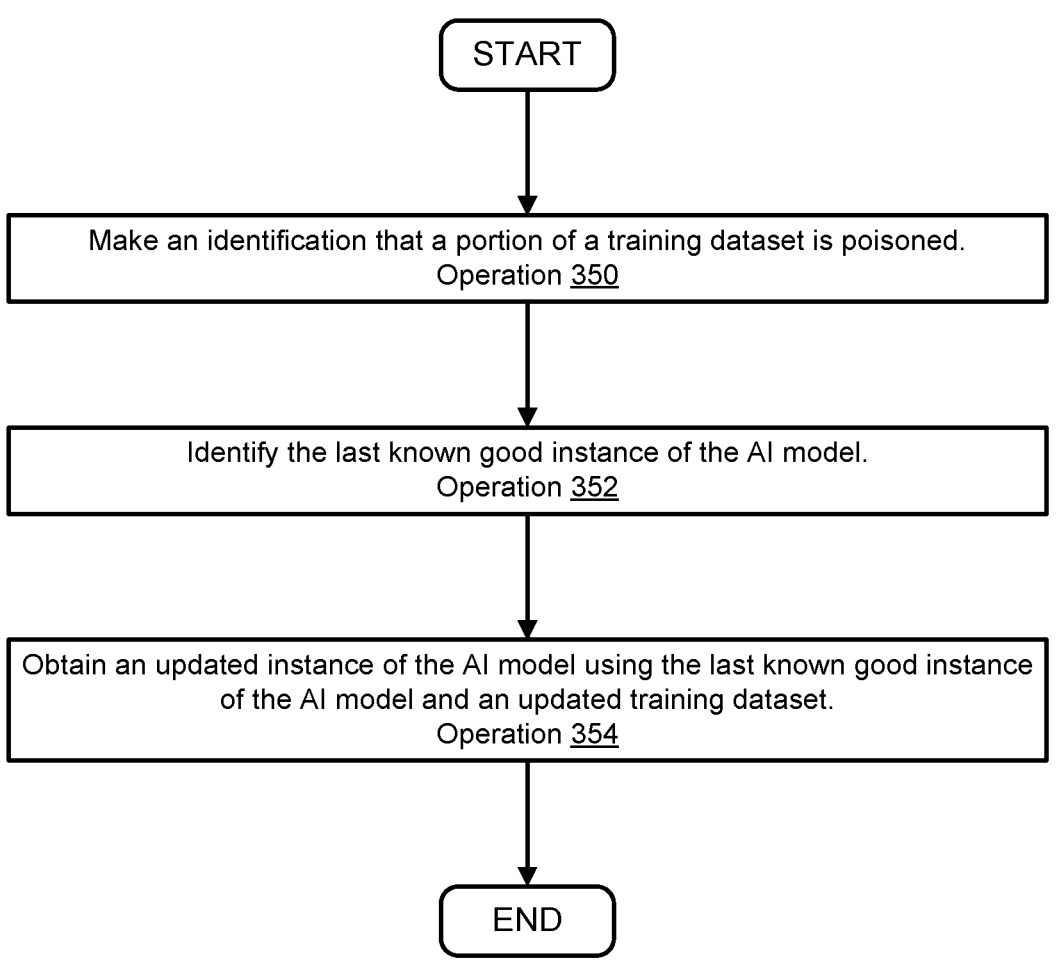
FIG. 3B shows a flow diagram illustrating a method of managing poisoned training data in accordance with an embodiment.
Figure 3C:
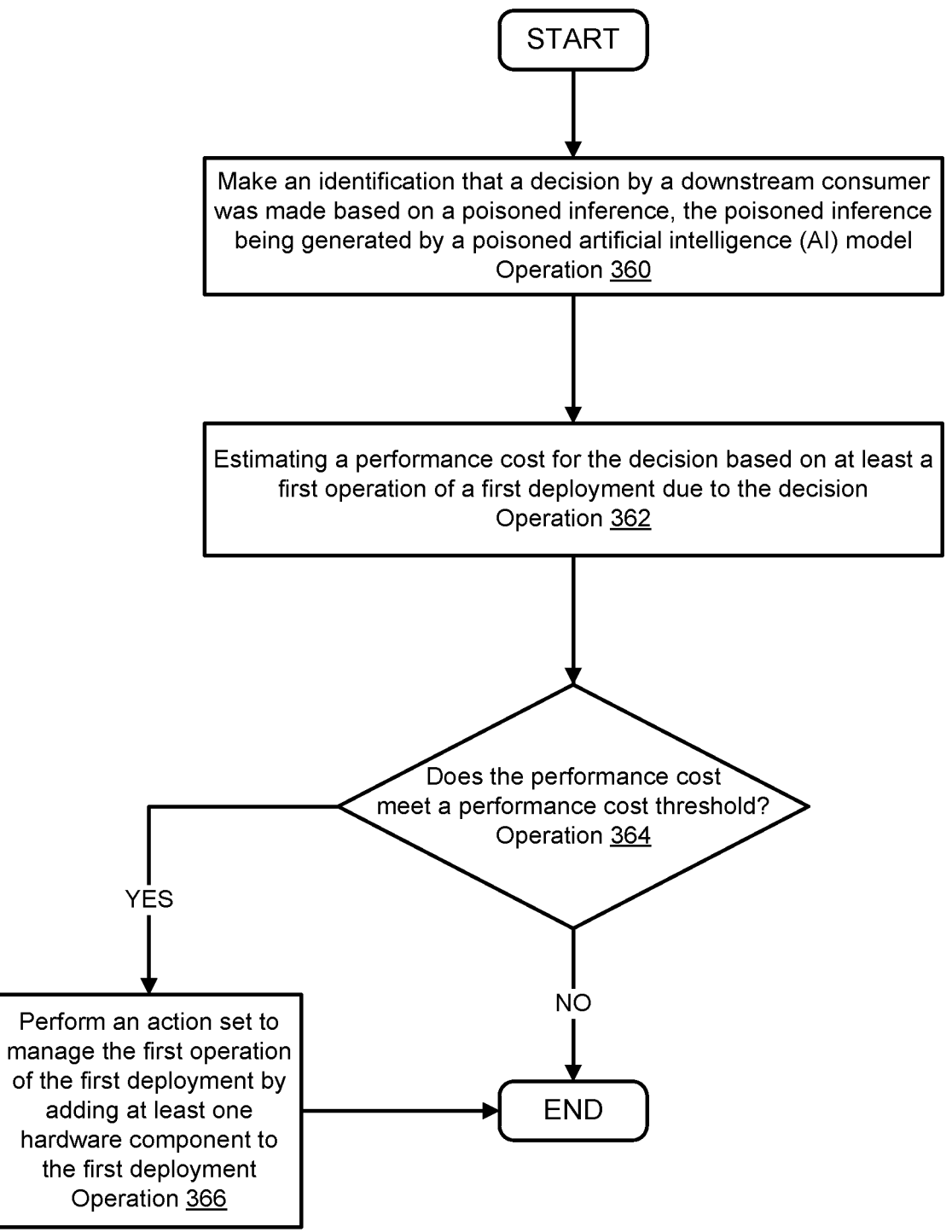
FIG. 3C shows a flow diagram illustrating a method of managing impact of a poisoned inference on decisions made by an inference consumer in accordance with an embodiment.

As discussed above, the components of FIG. 1 may perform various methods to manage AI models. FIGS. 3A-3C illustrate methods that may be performed by the components of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method of updating an AI model instance in accordance with an embodiment is shown. The method may be performed by a data processing system, and/or another device.

At operation 300, an AI model and a training dataset may be obtained. The AI model may be obtained by (i) reading the AI model from storage, (ii) receiving the AI model from another device, and/or (iii) generating the AI model, for example by programming a data processing system and/or another device. The AI model may be a particular type of AI model, such as a linear regression model, a deep neural network, a decision tree, etc.

The type of AI model obtained may depend on the goals of inference consumers and/or other factors such as (i) training dataset characteristics (e.g., data type, size and/or complexity), (ii) cost limitations (e.g., the cost to train and/or maintain the AI model), (iii) time limitations (e.g., the time to train the AI model and/or for inference generation), and/or (iv) inference characteristics (e.g., accuracy and/or inference type). For example, a complex AI model such as a multi-layered neural network may process a large amount of complex data and generate highly accurate inferences, but may be costly to train and maintain and may have low explainability (e.g., may act as a "black box"). In contrast, a linear regression model may be a simpler, less costly AI model with high explainability, but may only be well-suited for data whose labels are linearly correlated with the selected features, and may generate less accurate inferences than a neural network.

The training dataset may be obtained by (i) reading the training dataset from storage, (ii) receiving the training dataset from another device, and/or (iii) generating the training dataset, for example, by gathering and measuring information from one or more data sources. The training dataset may include labeled data or unlabeled data. Training data included in the training dataset may be processed, cleansed and/or evaluated for quality in order to prepare the training dataset for use in training AI models.

At operation 302, a trained AI model instance may be obtained using the AI model and the training dataset. The trained AI model may be obtained by training the AI model to relate pieces of data (e.g., an input and an output) from the training dataset using a training system, such as the one in FIGS. 2A-2C. To do so, the training dataset and the AI model may be input to the training system.

The training system may employ machine learning techniques such as supervised learning, unsupervised learning, semi-supervised learning, etc. As part of the training process, the AI model may undergo a validation and/or testing step to improve and/or measure the reliability of generated inferences.

At operation 304, an inference is obtained using the trained AI model instance and an ingest dataset. The inference may be obtained by feeding ingest data collected from one or more data sources to the trained AI model instance. The trained AI model instance may produce the inference as output in response to the ingest data.

The inference may be received by an AI model manager which may then provide the inference to inference consumers. An inference consumer may use the provided inference to help with decision-making and/or problem-solving. Any number of inferences may be obtained from the trained AI model instance and provided to inference consumers until the trained AI model instance is replaced with an updated AI model instance.

At operation 306, a determination is made regarding whether an update condition is satisfied. The determination may be made by comparing characteristics of the trained AI model, characteristics of available training data, and/or other characteristics to corresponding conditions that, if met, indicate that the update condition is satisfied.

For example, the update condition may be satisfied if (i) a sufficient amount of new training data has been gathered for updating purposes (e.g., based on comparison to a training data threshold), (ii) the AI model inference accuracy is unsatisfactory (e.g., based on a comparison to an inference accuracy threshold), (iii) an AI model is updated according to a schedule that fits business needs (e.g., based on a comparison between when the trained AI model was last updated and the current point in time), and/or (iv) other basis of comparison between the current characteristics of the AI model, training data, etc.

If at operation 306 the update condition is not satisfied, then the method may return to operation 304 (e.g., thereby allowing for another inference to be obtained using the currently trained AI model instance and available ingest data). However, if the update condition is satisfied, then the method may proceed to operation 308.

At operation 308, a snapshot of the trained AI model instance is obtained. The snapshot of the trained AI model instance may be obtained by (i) reading the snapshot from storage, (ii) obtaining the snapshot from another device, and/or (iii) by generating the snapshot.

The snapshot may be generated by storing, in a non-transitory storage medium, (i) a copy of the structure of the instance of the AI model, (ii) metadata for the inferences obtained from the instance of the AI model, the metadata indicating an inference consumer that has consumed the inference, (iii) a copy of the portion (and/or metadata for accessing an archived portion) of the training dataset used to train the instance of the AI model, and/or (iv) metadata identifying data sources from which training data has been collected.

The structure of the instance of the AI model may be stored by (i) storing a copy of the architecture of the AI model and parameters (e.g., weights for the hidden layers) that may change as the AI model is modified over time, or (ii) storing a reference to the architecture (if previously stored) and the parameters of the AI model. For example, when first stored, both the architecture of the AI model (e.g., which may include a description of the neurons, bias function descriptions, activation function descriptions, etc.) and the parameters may be stored. However, as the AI model is evolved, the structure may be stored as part of the snapshot by merely referencing the existing stored architecture and storing the changed parameters.

The parameters may include, for example, a first element from a hidden layer of the instance of the AI model (e.g., the process may be extended until all weights for the instance of the AI model are stored). Additionally, metadata regarding the structure of the instance of the AI model may also be stored to facilitate identification of the instance of the AI model and/or for other purposes.

An initial snapshot of an AI model may include information that may remain static throughout the life of the AI model (e.g., the structure of the AI model), whereas subsequent snapshots may only include dynamic information (e.g., weights).

The metadata for the inference may be stored by storing: (i) an association between the poisoned AI model and the poisoned inference, (ii) an identifier for the ingest data used to generate the poisoned inference, (iii) an identifier for the inference consumer that has consumed (or will consume) the poisoned inference, and/or (iv) other metadata (e.g., a time stamp indicating when the inference was generated, etc.). Any number of snapshots of AI model instances may be stored in a snapshot database.

By storing the snapshot of an AI model instance, the snapshot may be used to (i) reduce the computational costs for reverting a poisoned AI model instance to a previous AI model instance that is unpoisoned (e.g., not trained using poisoned data), (ii) mitigate the effects of a poisoned inference provided to inference consumers, and/or (iii) purge poisoned training data from a training data repository to avoid poisoning any updated AI models that may be updated (e.g., trained) using the poisoned training data. However, if poisoned training data is not identified, AI models may be continuously updated (e.g., trained) as updated training data (e.g., new training data) is made available.

At operation 310, an updated AI model instance is obtained using an updated training dataset. The updated AI model instance may be obtained by further training (e.g., updating) the trained AI model instance to relate pieces of data from an updated training dataset using a training system. The updated training dataset may include newly acquired training data (e.g., training data that has not already been used to train the trained AI model instance).

The training system may employ machine-learning methods such as incremental learning, which may allow an additional training step as new training data becomes available, and may adjust what has already been learned by the AI model according to the new training data. Traditional machine learning methods may assume the availability of a sufficient training dataset before the first training process begins and may not allow for adjustments when only new training data is introduced. In either case, at the time poisoned training data is introduced into the training dataset, the subsequently trained and/or updated AI models may be affected by the poisoned training data, requiring reverting to an AI model that has not been trained using poisoned training data.

The method may end following operation 310.

Turning to FIG. 3B, a flow diagram illustrating a method of managing poisoned training data in accordance with an embodiment is shown. The method may be performed by a data processing system, and/or another device.

At operation 350, an identification is made that a portion of a training dataset is poisoned. The identification may be made by (i) receiving the identification from another entity, (ii) reading the identification from storage, and/or (iv) generating the identification. The identification may be generated, for example, by performing various analysis of training data and/or operation of entities from which the training data may be obtained.

At operation 352, the last known good instance of the AI model is identified. The last known good instance of the AI model may be identified by identifying a second AI model instance trained using the poisoned training dataset, identifying a first AI model instance trained before the second AI model instance (e.g., that is not trained using the poisoned training dataset), and using the first AI model instance as the last known good instance of the AI model.

To do so, a snapshot of the second AI model instance (e.g., a poisoned snapshot) may be located in a snapshot database. Bidirectional differences may be stored along with the snapshot to indicate differences between incremental snapshots stored within the snapshot database. The bidirectional differences may include parameters (e.g., weights of a neural network, etc.) that change between incremental snapshots in both directions (e.g., between incremental snapshots taken before and after each full snapshot). The bidirectional differences may be stored in higher performance storage than the full snapshots and may, therefore, be more easily accessible. The bidirectional differences associated with the poisoned snapshot may be accessed and evaluated to identify the first AI model instance (e.g., the unpoisoned instance).

At operation 354, an updated instance of the AI model is obtained using the last known good instance of the AI model and an updated training dataset. The updated training dataset may be obtained by reading training data from an updated training data repository. The updated training data repository may be obtained by purging (e.g., removing) the identified poisoned training dataset (e.g., from operation 350) from an existing training data repository so that the updated training repository may be free of poisoned training data.

The updated instance of the AI model may be obtained by further training (e.g., updating) the last known good instance of the AI model from operation 352. The updated instance of the AI model may be trained to relate pieces of data from the updated training dataset from operation 354, using a training system, (e.g., analogous to operations 302 and 310). The resulting trained updated instance of the AI model may be used to obtain unpoisoned inferences (e.g., replacement inferences and/or new inferences).

The method may end following operation 354.

Turning to FIG. 3C, a flow diagram illustrating a method of managing impact of poisoned inferences on inference consumers in accordance with an embodiment is shown. The operations in FIG. 3C may be performed by AI model manager 104, data sources 100, inference consumers 102, and/or any other entity without departing from embodiments disclosed herein.

At operation 360, an identification is made that a decision by a downstream consumer was made based on a poisoned inference, the poisoned inference being generated by a poisoned AI model. Making the identification may include: (i) reading data from storage indicating that the poisoned inference has been provided to the inference consumer and that the inference consumer made a decision based, at least in part, on the poisoned inference, (ii) receiving a notification from another entity (e.g., the inference consumer, etc.) indicating that a poisoned inference has been provided to the inference consumer and that the inference consumer has made a decision based, at least in part, on the poisoned inference, (iii) determining that at least a portion of training data used to train the AI model is poisoned and identifying inferences generated by the AI model that have been provided to the inference consumer as poisoned inferences, and/or (iv) other methods.

At operation 362, a performance cost for the decision is estimated based on at least a first operation of a first deployment due to the decision. Estimating the performance cost may include: (i) identifying hardware components for a second deployment using an unpoisoned inference, the unpoisoned inference being a replacement inference for the poisoned inference and generated using an unpoisoned instance of the AI model, (ii) obtaining a deviation between the first operation of the first deployment and a second operation of the second deployment, (iii) obtaining a confidence score for the deviation, the confidence score indicating a level of uncertainty associated with the first operation and/or the second operation, and/or (iv) treating the deviation and the confidence score as the performance cost.

Identifying the hardware components for the second deployment may include: (i) obtaining an unpoisoned instance of the AI model, (ii) obtaining ingest data previously used by the poisoned instance of the AI model to produce the poisoned inference. (iii) feeding the ingest data into the unpoisoned instance of the inference model, and/or (iv) obtaining, as output from the unpoisoned instance of the inference model, an inference that predicts hardware components that may have met the needs of the consumer at the time the poisoned inference was obtained. Refer to FIG. 3B and/or FIG. 2B for additional information regarding obtaining an unpoisoned instance of the AI model and a replacement inference for the poisoned inference.

For example, the ingest data may include a series of goals of the customer (e.g., computing goals including processor speed, storage capacity, network bandwidth consumption, etc.). The ingest data may be obtained at the time the poisoned inference was generated. The ingest data may be fed into the unpoisoned instance of the AI model and an inference may be obtained as output from the AI model, the inference including a list of hardware components that may retrospectively meet the needs of the customer at the time the poisoned inference was generated.

Identifying the hardware components for the second deployment may also include: (i) reading a list of the hardware components for the second deployment from storage, (ii) receiving the list of the hardware components for the second deployment in the form of a transmission over a communications network, and/or (iii) via other methods.

Obtaining the deviation may include: (i) obtaining a first operation of the first deployment, (ii) obtaining a second operation of the second deployment, (iii) determining a difference between the first operation and the second operation, (iv) treating the difference as the deviation, and/or (v) other methods.

For example, the first operation may include a series of metrics indicating performance capabilities of the first deployment. In the context of hardware deployments usable to manage a database for the customer, the series of metrics may include: (i) a processor speed (e.g., a number of times data can be read from the database per unit time), (ii) a storage capacity (e.g., how much video footage can be encoded per unit time), (ii) a network bandwidth consumption (e.g., how many video streams can be concurrently delivered over a communications network), and/or (iii) other metrics.

The first operation may be obtained by: (i) reading the first operation from storage, (ii) obtaining the first operation in the form of a transmission over a communications network from another entity, (iii) generating the first operation (e.g., via simulating the performance capabilities of the hardware components in the context of the customer's goals using an inference model, etc.), and/or (iv) via other methods.

Similarly, the second operation may include a series of metrics indicating performance capabilities of the second deployment. The series of metrics of the second operation may correspond to the series of metrics of the first operation (e.g., both may include a processor speed, etc.).

The second operation may be obtained by: (i) reading the second operation from storage, (ii) obtaining the second operation in the form of a transmission over a communications network from another entity, (iii) generating the second operation (e.g., via simulating the performance capabilities of the hardware components in the context of the customer's goals using an inference model, etc.), and/or (iv) via other methods.

Obtaining the confidence score for the deviation may include: (i) obtaining a first confidence score for the first deployment, (ii) obtaining a second confidence score for the second deployment, (iii) calculating the confidence score for the deviation using the first confidence score and the second confidence score, and/or (iv) other methods.

Obtaining the first confidence score may include: (i) reading the first confidence score from storage, (ii) obtaining the first confidence score from another entity in the form of a transmission over a communication system, (iii) generating the first confidence score as an output from an inference model that generated the first operation, and/or (iv) via other methods.

Obtaining the second confidence score may include: (i) reading the second confidence score from storage, (ii) obtaining the second confidence score from another entity in the form of a transmission over a communication system, (iii) generating the second confidence score as an output from an inference model that generated the second operation, and/or (iv) via other methods.

The confidence score may be calculated by aggregating numerical quantities associated with the first confidence score and the second confidence score. The numerical quantities may be aggregated by, for example, adding the numerical quantities, finding an average of the numerical quantities, and/or via other methods.

Treating the deviation and the confidence score as the performance cost may include encapsulating the deviation and the confidence score in a data structure and modifying a label associated with the data structure to indicate that the data structure includes the performance cost for the first deployment. Treating the deviation and the confidence score as the performance cost may also include obtaining the performance cost from another entity and determining that the performance cost includes the deviation and the confidence score.

At operation 364, it is determined whether the performance cost meets a performance cost threshold. Determining whether the performance cost meets the performance cost threshold may include: (i) making a first comparison between the confidence score and a confidence score threshold and/or (ii) if the confidence score does not meet the confidence score threshold, concluding that the performance cost does not meet the performance cost threshold.

Comparing the confidence score to the confidence score threshold may include: (i) identifying a numerical quantity associated with the confidence score, (ii) identifying a numerical quantity associated with the confidence score threshold, (iii) determining whether the numerical quantity associated with the confidence score is greater than or equal to the numerical quantity associated with the confidence score threshold, and/or (iv) other methods.

Comparing the confidence score to the confidence score threshold may also include providing the confidence score and the confidence score threshold to another entity responsible for comparing the confidence score to the confidence score threshold and receiving a notification in response indicating whether the confidence score meets the confidence score threshold.

If the confidence score meets the confidence score threshold, determining whether the performance cost meets the performance cost threshold may also include: (i) comparing the deviation to a deviation threshold, (ii) if the deviation meets the deviation threshold, concluding that the performance cost meets the performance cost threshold, and/or (iii) if the deviation does not meet the deviation threshold, concluding that the performance cost does not meet the performance cost threshold.

Comparing the deviation to the deviation threshold may include: (i) identifying a numerical quantity associated with the deviation, (ii) identifying a numerical quantity associated with the deviation threshold, (iii) determining whether the numerical quantity associated with the deviation is greater than or equal to the numerical quantity associated with the deviation threshold, and/or (iv) other methods.

Comparing the deviation to the deviation threshold may also include providing the deviation and the deviation threshold to another entity responsible for comparing the deviation to the deviation threshold and receiving a notification in response indicating whether the deviation meets the deviation threshold.

Concluding that the performance cost meets the performance cost threshold may include: (i) transmitting a notification to another entity indicating that the performance cost meets the performance cost threshold, (ii) initiating performance of an action set in response to the performance cost meeting the performance cost threshold, (iii) transmitting a notification to the recipient of the first deployment (e.g., the customer) that the first deployment may require modification, and/or (iv) other actions.

Concluding that the performance cost does not meet the performance cost threshold may include: (i) transmitting a notification to another entity indicating that the performance cost does not meet the performance cost threshold, (ii) performing no action in response to the performance cost not meeting the performance cost threshold, (iii) transmitting a notification to the recipient of the first deployment (e.g., the customer) that the first deployment may not require modification, and/or (iv) other actions.

At operation 366, an action set may be performed to manage the first operation of the first deployment by adding at least one hardware component to the first deployment. Performing the action set may include: (i) identifying a third deployment based, at least in part, on the second deployment, (ii) modifying the first deployment based on the third deployment by adding the at least one additional hardware component to the first deployment, and/or (iii) other methods.

Identifying the third deployment may include performing a global optimization process and obtaining a listing of hardware components to be deployed to the customer as output from the global optimization process. The global optimization process may be performed by: (i) identifying one or more possible additional hardware components to supplement the first deployment, (ii) identifying a potential financial cost and a potential reduction in performance cost (and/or additional information) associated with adding each of the possible additional hardware components to the third deployment, (iii) determining which of the possible additional hardware components to the third deployment based on minimization of the financial cost and maximization of the reduction in performance cost, and/or (iv) other actions.

The global optimization process may be performed by: (i) requesting information related to the first deployment and second deployment from another entity and executing instructions for the global optimization process, (ii) providing the information related to the first deployment and the second deployment to another entity responsible for performing the global optimization process, and/or (iii) other methods.

Modifying the first deployment may include: (i) shipping the at least one additional hardware component to the first deployment, (ii) installing the at least one additional hardware component with the first hardware components of the first deployment, and/or (iii) other methods.

Shipping the at least one additional hardware component to the first deployment may include: (i) providing instructions to an entity (e.g., another device via an application programming interface (API), a user via a graphical user interface (GUI), etc.) to gather and send the at least one additional hardware component to the customer, (ii) providing a notification to the customer that the at least one additional hardware component is being sent, and/or (iii) other methods.

Installing the at least one additional hardware component with the first hardware components may include: (i) providing instructions to the customer (and/or another entity) for connecting and operating the at least one additional hardware component, (ii) requesting another entity assist the customer with the installation of the at least one additional hardware component by transmitting the request over a communication system, (iii) adding a log entry to a site visit log, the site visit log indicating which customers may require local support by a subject matter expert, and/or (iv) other actions.

The method may end following operation 366.

Figure 4:
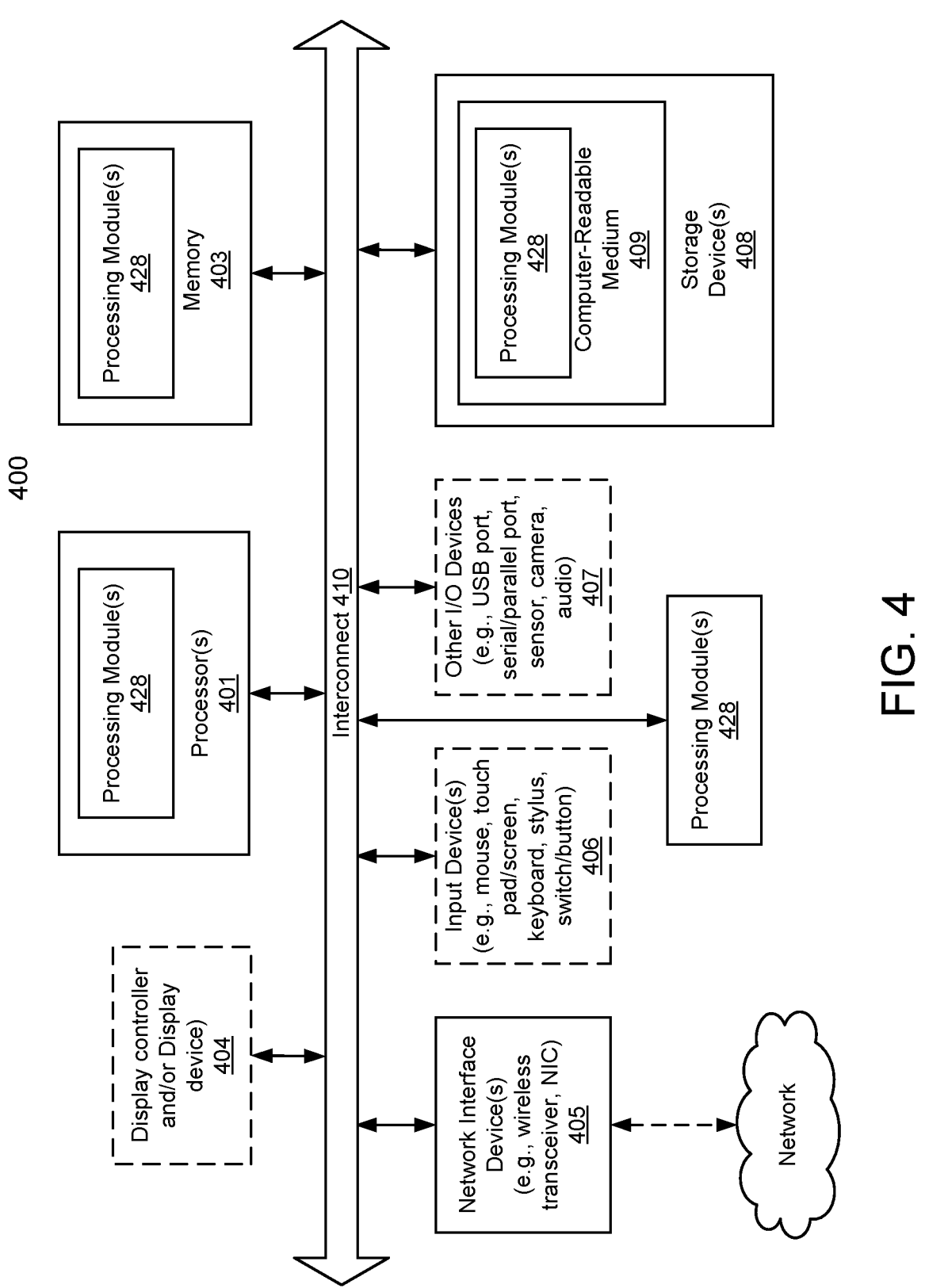
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs, or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method of managing an impact of poisoned inferences on downstream consumers, the method comprising:

making an identification that a decision by a downstream consumer of the downstream consumers was made based on a poisoned inference of the poisoned inferences, the poisoned inference being generated by a poisoned artificial intelligence (AI) model;

estimating a performance cost for the decision based on at least a first operation of a first deployment due to the decision;

making a determination regarding whether the performance cost meets a performance cost threshold; and in an instance of the determination in which the performance cost meets the performance cost threshold:

performing an action set to manage the first operation of the first deployment by adding at least one additional hardware component to the first deployment.

2. The method of claim 1, wherein the decision comprises identifying first hardware components for the first deployment using the poisoned inference and deploying instances of the first hardware components to obtain the first deployment for use by the downstream consumer.

3. The method of claim 2, wherein estimating the performance cost for the decision comprises:

identifying hardware components for a second deployment using an unpoisoned inference, the unpoisoned inference being a replacement inference for the poisoned inference and generated using an unpoisoned instance of the AI model;

obtaining a deviation between the first operation of the first deployment and a second operation of the second deployment;

obtaining a confidence score for the deviation, the confidence score indicating a level of uncertainty associated with the first operation and/or the second operation; and treating the deviation and the confidence score as the performance cost.

4. The method of claim 3, wherein the second deployment includes second hardware components, the second hardware components being based on a retrospective assessment of needs of the downstream consumer at a time the poisoned inference was made.

5. The method of claim 3, wherein making the determination comprises:

making a first comparison between the confidence score and a confidence score threshold; and in a first instance of the first comparison in which the confidence score does not meet the confidence score threshold:

concluding that the performance cost does not meet the performance cost threshold.

6. The method of claim 5, wherein making the determination further comprises:

in a second instance of the first comparison in which the confidence score meets the confidence score threshold:

making a second comparison between the deviation and a deviation threshold;

in a first instance of the second comparison in which the deviation meets the deviation threshold:

concluding that the performance cost meets the performance cost threshold; and in a second instance of the second comparison in which the deviation does not meet the deviation threshold:

concluding that the performance cost does not meet the performance cost threshold.

7. The method of claim 3, wherein performing the action set comprises:

identifying a third deployment based, at least in part, on the second deployment; and modifying the first deployment based on the third deployment by adding the at least one additional hardware component to the first deployment.

8. The method of claim 7, wherein the third deployment is identified at least in part using a global optimization process that considers the performance cost, a financial cost for adding the at least one additional hardware component to the first deployment, and a reduction in the performance cost due to addition of the at least one additional hardware component to the first deployment.

9. The method of claim 8, wherein modifying the first deployment comprises shipping the at least one additional hardware component to the first deployment and installing the at least one additional hardware component with the first hardware components of the first deployment.

10. A non-transitory machine-readable medium having instructions stored therein, which when executed by a processor, cause the processor to perform operations for managing an impact of inferences provided to an inference consumer on operation of the inference consumer, the operations comprising:

making an identification that a decision by a downstream consumer of the downstream consumers was made based on a poisoned inference of the poisoned inferences, the poisoned inference being generated by a poisoned artificial intelligence (AI) model;

estimating a performance cost for the decision based on at least a first operation of a first deployment due to the decision;

making a determination regarding whether the performance cost meets a performance cost threshold; and in an instance of the determination in which the performance cost meets the performance cost threshold:

performing an action set to manage the first operation of the first deployment by adding at least one additional hardware component to the first deployment.

11. The non-transitory machine-readable medium of claim 10, wherein the decision comprises identifying first hardware components for the first deployment using the poisoned inference and deploying instances of the first hardware components to obtain the first deployment for use by the downstream consumer.

12. The non-transitory machine-readable medium of claim 11, wherein estimating the performance cost for the decision comprises:

identifying hardware components for a second deployment using an unpoisoned inference, the unpoisoned inference being a replacement inference for the poisoned inference and generated using an unpoisoned instance of the AI model;

obtaining a deviation between the first operation of the first deployment and a second operation of the second deployment;

obtaining a confidence score for the deviation, the confidence score indicating a level of uncertainty associated with the first operation and/or the second operation; and treating the deviation and the confidence score as the performance cost.

13. The non-transitory machine-readable medium of claim 12, wherein the second deployment includes second hardware components, the second hardware components being based on a retrospective assessment of needs of the downstream consumer at a time the poisoned inference was made.

14. The non-transitory machine-readable medium of claim 12, wherein making the determination comprises:

making a first comparison between the confidence score and a confidence score threshold; and in a first instance of the first comparison in which the confidence score does not meet the confidence score threshold:

concluding that the performance cost does not meet the performance cost threshold.

15. The non-transitory machine-readable medium of claim 14, wherein making the determination further comprises:

in a second instance of the first comparison in which the confidence score meets the confidence score threshold:

making a second comparison between the deviation and a deviation threshold;

in a first instance of the second comparison in which the deviation meets the deviation threshold:

concluding that the performance cost meets the performance cost threshold; and in a second instance of the second comparison in which the deviation does not meet the deviation threshold:

concluding that the performance cost does not meet the performance cost threshold.

16. A data processing system, comprising:

a processor; and a memory coupled to the processor to store instructions, which when executed by the processor, cause the processor to perform operations for managing an impact of inferences provided to an inference consumer on operation of the inference consumer, the operations comprising:

making an identification that a decision by a downstream consumer of the downstream consumers was made based on a poisoned inference of the poisoned inferences, the poisoned inference being generated by a poisoned artificial intelligence (AI) model;

estimating a performance cost for the decision based on at least a first operation of a first deployment due to the decision;

making a determination regarding whether the performance cost meets a performance cost threshold; and in an instance of the determination in which the performance cost meets the performance cost threshold:

performing an action set to manage the first operation of the first deployment by adding at least one additional hardware component to the first deployment.

17. The data processing system of claim 16, wherein the decision comprises identifying first hardware components for the first deployment using the poisoned inference and deploying instances of the first hardware components to obtain the first deployment for use by the downstream consumer.

18. The data processing system of claim 17, wherein estimating the performance cost for the decision comprises:

identifying hardware components for a second deployment using an unpoisoned inference, the unpoisoned inference being a replacement inference for the poisoned inference and generated using an unpoisoned instance of the AI model;

obtaining a deviation between the first operation of the first deployment and a second operation of the second deployment;

obtaining a confidence score for the deviation, the confidence score indicating a level of uncertainty associated with the first operation and/or the second operation; and treating the deviation and the confidence score as the performance cost.

19. The data processing system of claim 18, wherein the second deployment includes second hardware components, the second hardware components being based on a retrospective assessment of needs of the downstream consumer at a time the poisoned inference was made.

20. The data processing system of claim 18, wherein making the determination comprises:

making a first comparison between the confidence score and a confidence score threshold; and in a first instance of the first comparison in which the confidence score does not meet the confidence score threshold:

concluding that the performance cost does not meet the performance cost threshold.

* * * * *